UNITED STATES PATENT OFFICE.

VICTOR M. GRISWOLD, OF LANCASTER, OHIO.

IMPROVED COLLODION FOR PHOTOGRAPHIC PICTURES.

Specification forming part of Letters Patent No. 15,336, dated July 15, 1856.

*To all whom it may concern:*

Be it known that I, VICTOR M. GRISWOLD, of the city of Lancaster, in the county of Fairfield and State of Ohio, have invented certain Improvements in the Art and Mode of Taking Photogenic Pictures; and I do hereby declare that the following is a full and exact description thereof.

The nature of my invention consists in an improvement in the photographic art of taking pictures.

*Albumenized collodion.*—To one quart of collodion, prepared in the usual way or manner, I add three ounces of a solution prepared thus: the clear solution which results from the whites of eggs which have been well beaten and one equal bulk of pure soft water. When this is added to the collodion it is thrown to the bottom in long, stringy white masses, which, after a few days, impart to the liquid albuminous properties, rendering the film closer in texture and bringing out all the minor details more sharply and perfectly than by the ordinary collodion, and giving to the picture a glossy and sparkling tone, unlike any produced by other means.

Another method which I frequently adopt is thus: albumen, as above, without water, to which is added iodide of potassium forty grains. This throws down the albumen in jelly-like masses, and when added to the collodion not only iodizes it, but produces the same effect upon the collodion as by the formula above.

Also another method: one ounce of chloroform, to which is added one-half ounce of albumen, prepared as above, iodized. This forms also a soft semi-transparent jelly, which, on being added to the collodion, produces, perhaps, the best effect of any of these preparations. This addition of albumen also answers a far better purpose than any that has hitherto been employed for freeing old samples of collodion from free iodine held in suspension, by which they can be rendered as clear and limpid as they were when first mixed.

What I claim as my invention, and desire to secure by Letters Patent, is—

The addition of albumen to collodion, in the manner and for the purpose herein and above specified.

V. M. GRISWOLD.

Witnesses:
ALFRED McVEIGH,
I. C. HENLEY.